United States Patent Office 2,794,031
Patented May 28, 1957

2,794,031

ACYLAMINOANTHRAQUINONES

Wolfgang Frey, Neuewelt, near Basel, and Albin Peter, Binningen, near Basel, Switzerland, assignors, by mesne assignments, to Saul & Co., Newark, N. J., as nominee of Fidelity Union Trust Company No Drawing. Application January 24, 1955,
Serial No. 483,825

Claims priority, application Switzerland January 29, 1954

6 Claims. (Cl. 260—377)

The present invention relates to acylaminoanthraquinones which are useful as dyestuffs for synthetic materials. More particularly, the invention has especial relation to a group of acylaminoanthraquinones which correspond to the formula

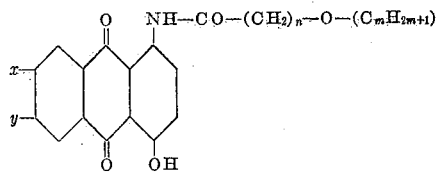

wherein each of $x$ and $y$ stands for hydrogen, fluorine, chlorine or bromine, $n$ is an integer from 2 to 5 inclusive, and $m$ is an integer from 1 to 8 inclusive.

These acylaminoanthraquinones can be prepared by reacting 1-amino-4-hydroxyanthraquinone or a derivative thereof which is substituted in the 6- and/or 7-positions by fluorine, chlorine and/or bromine, with a functional derivative of an alkoxy-fatty acid of the formula

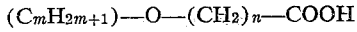

wherein $m$ and $n$ have the aforesaid significances. Illustrative of alkoxy-fatty acids which may be used in this connection are inter alia: 2-methoxy-propionic acid, 3-methoxy-butyric acid, 3-methoxy-valeric acid, 5-methoxy-caproic acid, 2-ethoxy-propionic acid, 3-ethoxy-butyric acid, 2-n-propoxy-propionic acid, 2-isopropoxy-propionic acid, 2-n-butoxy-propionic acid, 2-isoamyloxy-propionic acid, 2-octyloxy-propionic acid, 3-isobutoxy-butyric acid, etc.

Illustrative of functional derivatives of the alkoxy-fatty acids which may be used in the foregoing reaction are for example the anhydrides and the halides, and especially the chlorides. The acylation is most advantageously carried out with the acid chlorides.

The reaction is preferably carried out in an organic solvent medium, such for example benzene, toluene, xylene, chlorobenzene, dichlorobenzene, nitrobenzene, etc. The reactants, for instance, 1-amino-4-hydroxyanthraquinone and one of the afore-defined alkoxy-fatty acid chlorides, are heated in molar proportion or with a small excess of acid chloride in the selected solvent until the evolution of hydrogen chloride ceases and the zone of the starting material has disappeared from the chromatogram of a test specimen. Instead of allowing the hydrogen chloride to escape, it can be bound, in the reaction mixture by an added base, such for example as pyridine and its homologues or dimethylaminobenzene, or by an alkali metal compound which is soluble in the organic solvent, such for example as sodium acetate or potassium acetate. In such event, the reaction temperature may be lowered for instance down to room temperature (about 20–30° C.).

An alternative method of preparing the acylaminoanthraquinones of the present invention involves producing the alkoxy-fatty acid chloride reactant in the acylation mixture itself. To this end, the anthraquinone derivative, for example 1-amino-4-hydroxyanthraquinone, is heated in the selected solid in molar proportion or in a small excess with an alkoxy-fatty acid, as hereinbefore defined, after which there is added such quantity of thionyl chloride or phosphorus trichloride as is required for conversion into the acid chloride. The resultant hydrogen chloride is allowed to escape until the zone of the starting material has disappeared in the chromatogram of a test specimen.

The acylaminoanthraquinones are worked up from the reaction mixture by filtering off, in some cases after diluting the reaction solution with a low molecular alcohol, or by expelling the solvent, for example by direct distillation or by steam distillation. After being dried, the acylaminoanthraquinones are obtained as orange-colored crystalline powders.

In using the acylaminoanthraquinones as dyestuffs, they are converted into finely subdivided form advantageously with addition of dispersing agents, wetting agents or protective colloids. The said acylaminoanthraquinones dye synthetic materials such as polyesters (for example Dacron, Terylene, etc.); many of them are particularly distinguished by good affinity to acylated celluloses (for example acetate silk) and by good solubility in spinning masses of the latter. The dyeings possess noteworthy fastness properties, for example very good fastness to flue gas. More particularly, however, they are outstandingly light-fast. They are surprisingly superior, as regards fastness to light, to dyeings obtained with for example 1-methoxyacetylamino-4-hydroxyanthraquinone.

The following examples set forth presently preferred representative embodiments of the invention. In such examples the parts and percentages are by weight and the temperatures are in degrees centigrade.

EXAMPLE 1

12 parts of 1-amino-4-hydroxyanthraquinone are dissolved in 250 parts of chlorobenzene. Water is eliminated from the solution by brief and careful distillation. After cooling to 80°, 8 parts of 2-methoxy-propionic acid chloride are added to the water-free solution in the course of 10 minutes, and the mixture stirred at 80–100° until a chromatographed test specimen of the mixture no longer contains blue-red 1-amino-4-hydroxyanthraquinone. The chlorobenzene is then distilled off with steam, and the 1-(2'-methoxy)-propionylamino-4-hydroxyanthraquinone of the formula

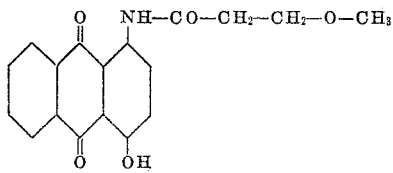

is filtered off, and washed and dried.

5 parts of the so-obtained crystalline powder or the corresponding quantity of the moist filter cake are stirred cold in 80 parts of water with 5 parts of 30% aqueous sodium hydroxide solution and 5 parts of a technical pyridine fraction which boils up to 140°, until orange-colored crystals are no longer visible under the microscope. The suspension is then poured into a mixture of 50 parts of water and 15 parts of technical 30% hydrochloric acid, and the resultant precipitate filtered off and washed neutral. It is then ground to colloidal size together with the technical condensation product of naphthalene sulfonic acid and formaldehyde in a stainless ball mill. The thus-obtained paste can be dried by atomization in a warm current of air. In this way, there is obtained an orange-colored powder which is readily dispersible in water. From aqueous suspension, this powder yields orange shades of excellent fastness to light and flue gas on acetate silk and Dacron.

EXAMPLE 2

200 parts of technical xylene mixture and 12 parts of 1-amino-4-hydroxyanthraquinone are freed of traces of water by distillation. To the resultant solution, 10.7 parts of 3-methoxy-butyric acid bromide are then added dropwise in the course of 15 minutes and at 60–80°. The reaction mass is stirred for an additional 30 minutes at 80° and is then heated to boiling until the starting material has disappeared. After distilling off the xylene with steam, the precipitate is filtered off, washed and dried. The thus-obtained 1-(3'-methoxy)-butyrylamino-4-hydroxyanthraquinone of the formula

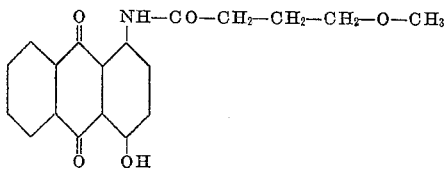

in finely divided form, produces vivid orange dyeings of excellent fastness to light and to flue gas on acetate silk, on Dacron and Terylene.

EXAMPLE 3

8.3 parts of 3-methoxy-valeric acid chloride are added dropwise, in the course of 30 minutes and at 40°, to an anhydrous solution of 12 parts of 1-amino-4-hydroxy anthraquinone in 250 parts of toluene and 6.5 parts of dimethylaminobenzene. The resultant mixture is stirred at 40–50° until the red starting material disappears. The toluene is then blown off with steam, and the obtained 1-(3'-methoxy)-valerianylamino-4-hydroxyanthraquinone of the formula

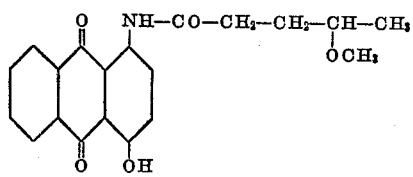

is filtered off, washed and dried. The product is converted into finely subdivided form and, in this state, yields dyeings of orange shade of excellent fastness to light and to flue gas on acetate silk, Dacron and Terylene.

EXAMPLE 4

12 parts of 1-amino-4-hydroxyanthraquinone, which has been dried at high temperature, are dissolved at 60° in 300 parts of dry chlorobenzene. 5 parts of pyridine are added to the solution, after which 9.5 parts of 5-methoxy-caproic acid chloride are run in within 30 minutes. The reaction mixture is stirred until the reaction has ended, whereupon the temperature may drop to 25°. The reaction mixture is then diluted with 250 parts of methanol and the precipitated 1-(5'-methoxy)-capronyl-amino-4-hydroxyanthraquinone of the formula

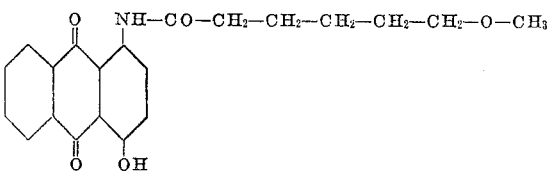

is filtered off at ambient temperature. It is washed with water and dried. Upon conversion into finely sub-divided form, there is obtained a dyestuff which dyes Dacron and Terylene in orange shades.

EXAMPLE 5

12 parts of 1-amino-4-hydroxyanthraquinone and 8 parts of 2-n-butoxy-propionic acid are dissolved in 250 parts of chlorobenzene. Water is removed from the solution by brief careful distillation. Thereupon, at 80° and in the course of 30 minutes, 6.6 parts of thionyl chloride are added dropwise to the solution with stirring at 100–110°, until a chromatographed test specimen of the mixture no longer contains blue-red 1-amino-4-hydroxyanthraquinone. The reaction mass is then cooled, poured into 200 parts of water, the resultant suspension adjusted to neutral by the addition of 1–3 parts of sodium carbonate and the solvent blown out therefrom with steam. The obtained 1-(2'-n-butoxy)-propionylamino-4-hydroxyanthraquinone of the formula

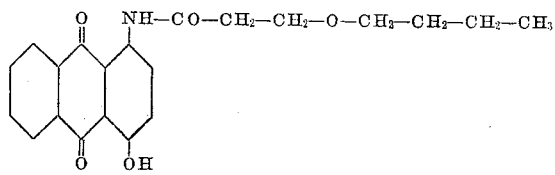

is then filtered off, washed and dried. After conversion thereof into finely subdivided state, the dyestuff dyes acetate silk, Dacron and Terylene in orange-colored shades of excellent fastness properties.

EXAMPLE 6

9 parts of dry 2-isoamyloxy-propionic acid and 6 parts of phosphorus trichloride are added to a water-free solution of 12 parts of 1-amino-4-hydroxyanthraquinone in 300 parts of chlorobenzene at 80°. Thereafter the mass is stirred at 110° until a chromatographed test specimen of the reaction mixture indicates the disappearance of the starting material. The dyestuff is then worked up after the manner set forth in Example 5. The so-obtained 1-(2'-isoamyloxy)-propionylamino-4-hydroxyanthraquinone of the formula

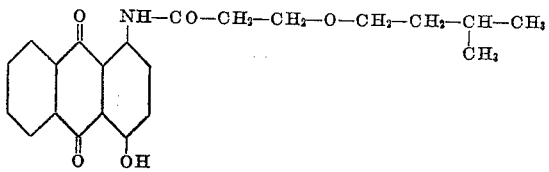

can, in view of its good solubility in acetone, be used for the spin-dyeing of acetate silk. In finely subdivided form the dyestuff also dyes acetate silk and polyester fibers in orange shades of good fastness properties.

Further examples of products according to the present invention are set forth in the following table, wherein the acylaminoanthraquinones are characterized in terms of the 1-amino-4-hydroxyanthraquinones and the alkoxy-fatty acids used in the preparation thereof and by the shade of their dyeings on polyester fibers. All the dyeings are fast to light and to flue gas.

Table

| Example No. | 1-Amino-4-hydroxyan-thraquinone | Alkoxy-fatty Acid | Shade of Dyeing on Polyester Fibers |
|---|---|---|---|
| 7 | 1 - amino - 4 - hydroxy-anthraquinone. | 2 - ethoxy - propionic - acid. | orange. |
| 8 | ___do___ | 3 - ethoxy - butyric - acid. | Do. |
| 9 | technical mixture of 1-amino - 4 - hydroxy - 6 - fluoroanthraquinone and 1 - amino-4-hydroxy - 7 - fluoroanthraquinone. | 3 - methoxy - butyric - acid. | reddish orange. |
| 10 | technical mixture of 1-amino - 4 - hydroxy - 6-chloroanthraquinone and 1 - amino - 4 - hydroxy - 7 - chloroanthraquinone. | ___do___ | Do. |
| 11 | technical mixture of 1-amino - 4 - hydroxy - 6-bromoanthraquinone and 1 - amino - 4 - hydroxy - 7 - bromoanthraquinone. | ___do___ | Do. |
| 12 | 1 - amino - 4- hydroxy-anthraquinone. | 2 - isopropoxy - propionic acid. | orange. |
| 13 | ___do___ | 2 - n - propoxy - propionic acid. | Do. |
| 14 | ___do___ | 2 - n - octyloxy - propionic acid. | Do. |
| 15 | 1 - amino - 4 - hydroxy -6, 7 - dichloroanthraquinone. | 2 - methoxy - propionic acid. | red-orange. |
| 16 | 1 - amino - 4-hydroxy - 6-chloro - 7 - bromoanthraquinone. | ___do___ | Do. |

The formulae of representative acylaminoanthraquinones of the foregoing table are:

(Example 7)

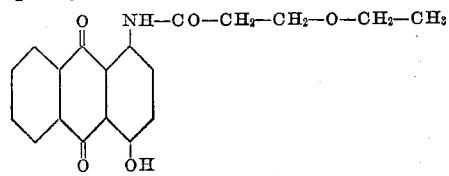

(Example 13)

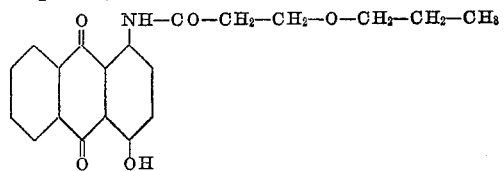

EXAMPLE 17

2 parts of the dyestuff prepared according to Example 5, are dispersed together with 20 parts of a swelling agent, for example an aqueous emulsion of chlorobenzene in 3000 parts of water at 60°. 100 parts of pre-wetted Terylene fabric are introduced into the suspension, the bath is then heated up to boiling point in the course of 20 minutes, and the dyeing of the fabric is finished at this temperature for 1 and ½ hours. The orange-colored Terylene fabric is then rinsed warm and cold.

EXAMPLE 18

2 parts of the dyestuff according to Example 12 are dispersed in 1500 parts of water in an autoclave, 100 parts of pre-wetted Dacron are introduced into the suspension, and the autoclave is closed. The latter is then heated to 100° in the course of 15 minutes, dyeing carried out for 20 minutes at this temperature and for 45 minutes at 125–130°. After cooling to 60°, the orange-dyed material is withdrawn and rinsed.

Having thus disclosed the invention what is claimed is:

1. An acylaminoanthraquinone which corresponds to the formula

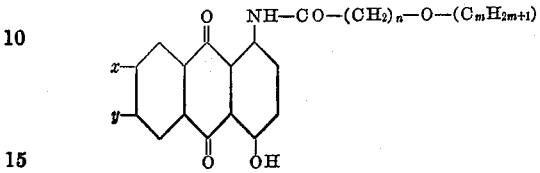

wherein each of $x$ and $y$ stands for a member selected from the group consisting of hydrogen, fluorine, chlorine and bromine, $n$ is one of the integers 2 to 5, and $m$ is one of the integers 1 to 8.

2. The acylaminoanthraquinone which corresponds to the formula

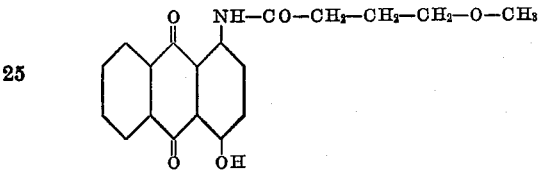

3. The acylaminoanthraquinone which corresponds to the formula

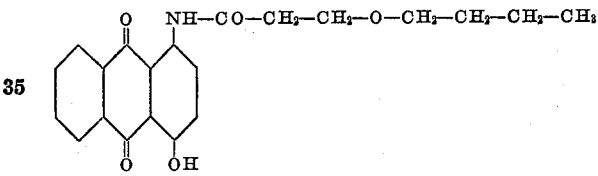

4. The acylaminoanthraquinone which corresponds to the formula

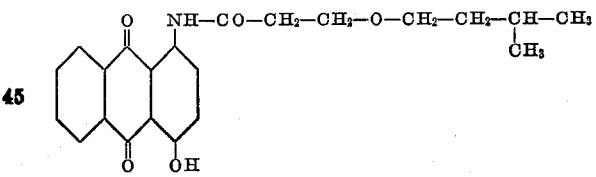

5. The acylaminonathraquinone which corresponds to the formula

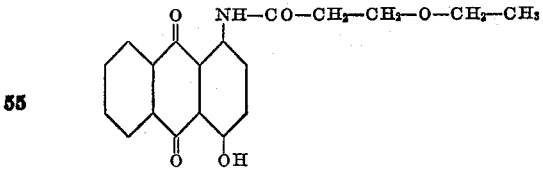

6. The acylaminoanthraquinone which corresponds to the formula

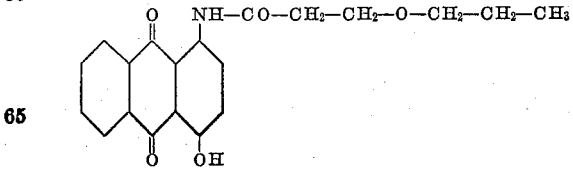

References Cited in the file of this patent

UNITED STATES PATENTS

| 957,041 | Deinet | May 3, 1910 |
| 1,784,240 | Meyer et al. | Feb. 25, 1930 |